United States Patent Office 2,729,627
Patented Jan. 3, 1956

2,729,627

POLYVINYL CHLORIDE FOR USE IN PLASTISOLS

Clide I. Carr, Jr., Fair Lawn, N. J., assignor to United States Rubber Company, New York, N. Y., a corporation of New Jersey No Drawing. Application November 26, 1952, Serial No. 322,795

9 Claims. (Cl. 260—92.8)

This invention relates to the polymerization of vinyl chloride and more particularly to the production of polyvinyl chloride for use in plastisols.

The term "plastisol" is well known in the art and refers to a fluid suspension of a resin in a non-volatile plasticizer which is a poor solvent for the resin at ordinary temperatures, but which dissolves the resin at elevated temperatures forming a gel, the resin and plasticizer remaining completely compatible on cooling. In practice, the plastisol is given the desired shape as by molding, casting, dipping, extruding, coating and the like, heated, and then cooled to produce the final article.

Polyvinyl chloride plastisols are used in the preparation of dipped goods, molded articles, films and coatings. The weight ratio of polymer to plasticizer therein is generally from 50/50 to 65/35. A good general purpose plastisol must have some fluidity at ambient temperatures. Its viscosity should be in the range from 1,000 to 25,000 centipoises at 25° C. for normal applications. Plastisols become less fluid, and the rigidity of articles made from the plastisols is increased, as the amount of polymer in the plastisol is increased. Generally, as much polymer is used as is possible without making the plastisol too viscous. Plastisol grades of polyvinyl chloride are made by emulsion polymerization, and the present invention relates to an improvement in such emulsion polymerizations.

As the particle size of the emulsion polymerized polyvinyl chloride is increased, the fluidity of plastisols prepared therefrom is increased. Thus, a polymer having a particle diameter of 0.4 micron gives a plastisol of relatively high viscosity (ca. 50,000 to 100,000 centipoises at 25° C.) in a 60/40 blend of resin and di(2-ethyl hexyl)phthalate, whereas a resin having a particle diameter of 0.8 micron gives a low viscosity plastisol (ca. 4,000–10,000 centipoises at 25° C.) in a similar 60/40 blend of resin and plasticizer. The plastisol prepared from the 0.4 micron resin has too high a viscosity and is useless for most plastisol applications, whereas the plastisol prepared from the 0.8 micron resin can be readily used for any application. Particle diameters referred to herein are average particle diameter measurements based on the area of the particles. Unfortunately, the problems confronted in preparing polyvinyl chloride emulsions increase as one attempts to make polymerizates of increasing particle size. Higher particle size resins tend to aggregate and flocculate before the polymerization is complete. This results in an undesirable graininess in articles prepared from plastisols containing these resins and, in general, relatively higher viscosity plastisols.

By the present invention, polyvinyl chloride having a smaller particle size than otherwise adaptable for plastisols, may be prepared and used to make plastisols of the requisite low fluidity. It has been my experience that polyvinyl chloride prepared by the conventional methods must have a particle size of more than 0.6 micron so as to be usable in reproducibly preparing general purpose plastisols with a viscosity of between 1,000 and 25,000 centipoises at 25° C. Polyvinyl chloride prepared according to the process of my invention, and having a particle size as low as 0.35 micron, can be used in preparing plastisols having viscosities within the range required for general purposes. The present invention may also be used to prepare polyvinyl chloride of a size that ordinarily would be suitable for making plastisols and this makes it possible to use such resins in plastisols having higher ratios of polymer to plasticizer. Thus, polyvinyl chloride polymers prepared by my invention, having a particle size from 0.35 to 0.9 micron, all impart greater fluidity to plastisols than polymers of similar particle size prepared by conventional methods.

According to the present invention, there is added a molecular weight regulator to the polymerizing vinyl chloride at a time when between 50% and 95% of the final conversion of vinyl chloride to polymer has been reached. The molecular weight regulator reduces the molecular weight of the polyvinyl chloride formed after the addition of the regulator, as compared to the molecular weight of the polyvinyl chloride formed before its addition. The amount of such molecular weight regulator used is between 0.1 and 10 parts per 100 parts of vinyl chloride monomer remaining in the reaction mixture at the time the regulator is added. However, the intrinsic viscosity of the final polyvinyl chloride should be 0.75 or higher, since the physical properties of articles prepared from plastisols containing such polymers are uniformly high. When the intrinsic viscosity of the polyvinyl chloride is below 0.75, the physical properties of plastisols prepared therewith are poor. Of course, differences in average molecular weight follow differences in instrinsic viscosity, the lower the intrinsic viscosity the lower the molecular weight, and the higher the intrinsic viscosity the higher the molecular weight. The magnitude of the lowering of the intrinsic viscosity is increased as the amount of regulator added is increased. Lower instrinsic viscosities result when the regulator is added at low conversions than when the regulator is added at high conversions. The amount of the molecular weight regulator within the range of 0.1 to 10% based on the monomeric vinyl chloride remaining that is added, and the conversion at which the regulator is added, should be such that the overall intrinsic viscosity of the final polyvinyl chloride will not be below 0.75. The temperature of polymerization is between 40° C. and 60° C., the higher the temperature the lower the intrinsic viscosity. The intrinsic viscosity of the final polymer according to the present invention may be from 0.75 to 1.3. The final conversion of monomer to polymer may be the conventional conversion of from 50% to 95%.

The intrinsic viscosity of polyvinyl chloride is obtained from viscosity measurements, at 30° C., of cyclohexanone solutions of the polyvinyl chloride and of the cyclohexanone solvent. The intrinsic viscosity $[\eta]$ is defined by the equation:

$$[\eta] = \lim_{C \to 0} \left(\frac{ln\eta_{rel.}}{C}\right)$$

where $\eta_{rel}$ is relative viscosity (i. e. viscosity of the solution of polymer relative to that of the solvent), and C is concentration of polymer in grams per 100 cc., the concentration being such that $\eta_{rel}$ has a value of from 1.15 to 1.4. Instrinc viscosity may also be defined by the equation:

$$[\eta] = \lim_{C \to 0} \left(\frac{\eta_{sp}}{C}\right)$$

where $\eta_{sp}$ is specific viscosity, and $\eta_{sp} = \eta_{rel} - 1$, and $\eta_{rel}$ and C are as in the formula first above.

The molecular weight regulator that is added after 50% to 95% of the final conversion of vinyl chloride monomer to polymer may be any of the various compounds that will lower the intrinsic viscosity of the polyvinyl chloride. Examples of such molecular weight regulators are: polyhaloalkanes, e. g. bromoform, carbon tetrachloride, trichloroethane, bromodichloromethane, dibromochloromethane, ethylene dibromide, 1-bromo-1,1-dichloroethane, 1,2-dibromo-1,1-dichloroethane; polyhaloalkenes, e. g. trichloroethylene, tetrachloroethylene; alkyl aldehydes, e. g. isobutyraldehyde; ethyl dibromoacetate and ethyl dibromomalonate; benzene sulfonyl chloride and its monomethyl and monohalo derivatives, e. g. p-tolyl sulfonyl chloride and p-bromo sulfonyl chloride; 1,1,1-tribromo-2-methyl propanol-2; allyl bromide; N-chlorophthalimide; alkyl iodides, e. g. methyl and ethyl iodides; phenacyl bromide.

The polyvinyl chloride latex of particle diameter from 0.35 to 0.9 micron may be prepared by known methods for preparing large particle size polyvinyl chloride latices. Where the initial emulsion of vinyl chloride contains all the emulsifying agent for stabilizing the final polyvinyl chloride latex, the particle diameter of the polyvinyl latex will be from 0.07 to 0.2 micron. Large particle size polyvinyl chloride latices of 0.35 to 0.9 micron average particle diameter as used in the present invention may be prepared by polymerizing the vinyl chloride emulsion in the presence of a small amount of a previously prepared polyvinyl chloride "seed" latex (British Patent 627,265), or by initially polymerizing the vinyl chloride emulsion, with or without a seed latex, in the presence of a portion only of the emulsifying agent desired in the final polymer latex and after partial polymerization adding further emulsifying agent and completing the polymerization (British Patents 630,611 and 634,647). Such known polymerizations are carried out at temperatures from 40° C. to 68° C. in the presence of conventional peroxygen catalysts, such as hydrogen peroxide or per salts, e. g. alkali persulfates, alkali perborates or alkali percarbonates. The emulsifying agent for the emulsion polymerization may be a conventional anionic surface-active agent, used in vinyl chloride polymerization, e. g. soaps of long chain fatty acids, long chain alkyl sulfates and sulfonates, sulfated and sulfonated ethers of long and short chain aliphatic groups, sulfonated alkyl esters and sulfonated glycol esters of long chain fatty acids, alkylated aryl sulfonates, and alkyl sulfosuccinates. The present invention is of advantage in making vinyl chloride plastisols with the various conventional plasticizers, e. g. dialkyl phthalates, e. g. di(2-ethyl hexyl phthalate), trialkyl phosphates, e. g. trioctyl phosphate; triaryl phosphates, tricresyl phosphate; dialkyl sebacates, e. g. dihexyl sebacate; dialkyl adipates, e. g. dioctyl adipate.

The following examples illustrate the invention:

*Example I*

A polyvinyl chloride latex was prepared in conventional manner by heating at 50° C. in a stainless steel bomb from which the air has been displaced by nitrogen, 200 parts of water, 100 parts of vinyl chloride, 0.2 part of potassium persulfate, 0.2 part of sodium laurate, and 0.16 part of sodium hydroxide. The reaction was carried out to 85% conversion. The latex, after removal of unreacted vinyl chloride monomer, contained 33% solids, and had an average particle diameter of 0.14 micron and an intrinsic viscosity of 1.1. This latex was used as a seed latex in preparing the plastisol grade of polyvinyl chloride according to the present invention, as follows:

The following polymerization recipe was placed in each of two stainless steel bombs from which the air had been displaced by nitrogen: 167 parts of water, 100 parts of vinyl chloride, 0.07 part of sodium hydroxide, 0.17 part of potassium persulfate, 0.07 part of sodium laurate and 2 parts (dry weight) of the above polyvinyl chloride seed latex. The bombs were sealed after the ingredients had been added to each of them. The sealed bombs were then agitated in a constant temperature bath set at 50° C. When about 18% of the vinyl chloride in the bombs had been converted to polymer, 0.167 part of sodium laurate and 3.34 parts of water was added to the reaction mixture in each of the bombs. When 60% of the vinyl chloride had been converted to polymer, 0.8 part of bromoform (2 parts per 100 parts of remaining vinyl chloride monomer) was added to one of the bombs. The reactions were permitted to continue until about 77% of the monomer had been converted to polymer in both bombs. At this point the remaining monomer was vented out of the each bomb and the polymerization reaction thereby terminated.

The final latices were diluted with water to about 10% solids and flocculated by the addition thereto of an amount of one-normal calcium chloride solution sufficient to make the latices about 0.05 N in calcium chloride. The resulting slurries were each filtered with suction and the separated polymers washed with water several times. Other known methods of recovering the polyvinyl chloride from the latex, such as by freezing, or by adding other electrolytes, or by spray drying may be used. The washed polymers from each bomb were then thoroughly dried. The polymers from both bombs had a particle size of 0.5 micron. The polymer to which bromoform had been added had an intrinsic viscosity of 0.96. The polymer to which no bromoform had been added had an intrinsic viscosity of 1.10.

Each polymer was mixed with di(2-ethyl hexyl)phthalate plasticizer in a Hobart mixer in a ratio of 60 polymer to 40 plasticizer. The viscosities of the resulting plastisols were measured with a Brookfield viscometer, using the number 5 spindle at 6 R. P. M. The viscosity of the plastisol made from the polymer to which bromoform had been added at 60% conversion was observed to be 10,000 centipoises. The viscosity of the plastisol made from the polymer to which no bromoform had been added, was observed to be 33,000 centipoises. One day later the viscosity of the former was 13,000 centipoises, and the viscosity of the latter was 35,000 centipoises. It will be noted that although both polymers had the same particle size, the viscosities of the plastisols prepared therefrom differed widely. The plastisol made from the polymer polymerized according to the process of my invention, i. e., with delayed addition of bromoform, has a low viscosity and can be used in all of the applications to which plastisols are put. The plastisol made with the polymer polymerized in the conventional manner has slight utility as a plastisol resin as its viscosity is too high.

*Example II*

A seed latex was prepared using the following recipe: 200 parts of water, 100 parts of vinyl chloride, 0.2 part emulsifier (the diamyl ester of sodium sulfosuccinic acid), and 0.2 part of disodium hydrogen phosphate. Another 0.2 part of the emulsifier and 4 parts of water were added at 60% conversion. The reaction was carried out at 50° C. in a stainless steel bomb to 85% conversion. The final seed latex contained about 30% solids. The polymer had a particle size of 0.22 micron and an intrinsic viscosity of 1.10.

The following emulsion polymerization recipe was placed in each of seven stainless steel bombs from which the air had been displaced with nitrogen: 167 parts of water, 100 parts of vinyl chloride, 0.17 part of disodium hydrogen phosphate, 0.17 part of potassium persulfate, 0.17 part of the diamyl ester of sodium sulfosuccinic acid, and 6.67 parts (dry weight) of the above polyvinyl chloride seed latex. The bombs were sealed after the ingredients had been added to each of them. The sealed bombs were then agitated in a constant temperature bath set at 50° C. When about 18% of the vinyl chloride in the bombs had been converted to polymer, 0.21 part of the diamyl ester of sodium sulfosuccinic acid and 8.3 parts of water were added to the reaction mixture in each of the bombs.

When 60% to 64% of the vinyl chloride in six of the seven bombs had been converted to polymer, a different molecular weight regulator was added to one of each of the six bombs and the polymerization continued to higher conversions between 65% and 90%. The charge in the seventh (control) bomb was polymerized to 91% conversion without addition of molecular weight regulator. The average particle diameter in all seven cases was approximately 0.5 micron. The vinyl chloride polymers were recovered from the latices as in Example I, and the intrinsic viscosity of samples of each were measured.

Each of the seven polymers was mixed with di(2-ethyl hexyl) phthalate plasticizer as in Example I, in a ratio of 60 polymer to 40 plasticizer. The viscosities of the plastisols were measured at 27° C. as in Example I. The following table shows the results of these measurements:

| Regulator Added | Amount of Regulator Added [1] | Percent Conversion at Addition of Regulator | Final Percent Conversion | Intrinsic Viscosity of Final Polymer | Viscosity of 60/40 Plastisol (centipoises) |
|---|---|---|---|---|---|
| None (control) | | | 91 | 1.13 | 32,000 |
| 1,2-dibromo-1,1-dichloroethane | 0.5 | 62 | 66 | 0.97 | 14,000 |
| 1,1,1-tribromo-2,methylpropanol-2 | 1.0 | 62 | 83 | 0.90 | 10,000 |
| Benzenesulfonyl chloride | 1.0 | 61 | 89 | 0.96 | 12,000 |
| Ethyl dibromoacetate | 1.0 | 60 | 90 | 0.92 | 11,400 |
| Isobutyraldehyde | 2.5 | 61 | 89 | 0.90 | 9,200 |
| Tetrachloroethylene | 5.0 | 64 | 87 | 0.94 | 13,000 |

[1] In parts per 100 parts of unpolymerized vinyl chloride present at time of addition of the regulator.

The control polyvinyl chloride to which no molecular weight regulator had been added in the course of the polymerization did not make a satisfactory plastisol in a 60/40 mixture with the di(2-ethyl hexyl)phthalate plasticizers whereas the various polyvinyl chlorides to which the different molecular weight regulators were added during the polymerization all made satisfactory plastisols under the same compounding conditions.

Having thus described my invention, what I claim and desire to protect by Letters Patent is:

1. The method of making polyvinyl chloride for use in preparing plastisols which comprises polymerizing an aqueous emulsion of vinyl chloride to a desired final conversion of monomeric vinyl chloride to polymer of 50% to 95% at a temperature from 40° C. to 60° C. to form a latex having an average particle diameter from 0.35 to 0.9 micron, and at a time between 50% and 95% of the desired final conversion of vinyl chloride monomer to polymer, adding to the reaction mixture a molecular weight regulator for polyvinyl chloride selected from the group consisting of polyhaloalkanes, polyhaloalkenes, alkyl aldehydes, ethyl dibromoacetate, ethyl dibromomalonate, benzene sulfonyl chloride and its monomethyl and monohalo derivatives, 1,1,1-tribromo-2-methyl proponal-2, allyl bromide, N-chlorophthalimide, alkyl iodides, and phenacyl bromide, in effective amount to give a final polymer having an intrinsic viscosity of from 0.75 to 1.3 measured in cyclohexanone at 30° C., and after the desired final conversion of vinyl chloride to polymer, removing any unreacted residual vinyl chloride monomer, and recovering the polyvinyl chloride from the latex.

2. The method of making polyvinyl chloride for use in preparing plastisols which comprises polymerizing an aqueous emulsion of vinyl chloride to a desired final conversion of monomeric vinyl chloride to polymer of 50% to 95% at a temperature from 40° C. to 60° C. to form a latex having an average particle diameter from 0.35 to 0.9 micron, and at a time between 50% and 95% of the desired final conversion of vinyl chloride monomer to polymer, adding to the reaction mixture a molecular weight regulator for polyvinyl chloride selected from the group consisting of polyhaloalkanes, polyhaloalkenes, alkyl aldehydes, ethyl dibromoacetate, ethyl dibromomalonate, benzene sulfonyl chloride and its monomethyl and monohalo derivatives, 1,1,1-tribromo-2-methyl proponal-2, allyl bromide, N-chlorophthalimide, alkyl iodides, and phenacyl bromide, in effective amount within the range of 0.1% to 10% based on the weight of monomeric vinyl chloride remaining in the reaction mixture at the time of addition of the regulator to give a final polymer having an intrinsic viscosity of from 0.75 to 1.3 measured in cyclohexanone at 30° C., and after the desired final conversion of vinyl chloride to polymer, removing any unreacted residual vinyl chloride monomer, and recovering the polyvinyl chloride from the latex.

3. The method as claimed in claim 2 in which the added molecular weight regulator is bromoform.

4. The method as claimed in claim 2 in which the added molecular weight regulator is 1,2-dibromo-1,1-dichloro ethane.

5. The method as claimed in claim 2 in which the added molecular weight regulator is benzenesulfonyl chloride.

6. The method as claimed in claim 2 in which the added molecular weight regulator is ethyl dibromoacetate.

7. The method as claimed in claim 2 in which the added molecular weight regulator is isobutyraldehyde.

8. In the method of emulsion polymerization of vinyl chloride at a temperature from 40° C. to 60° C. to a desired final conversion of monomeric vinyl chloride to polymer of 50% to 95% to form a latex having an average particle diameter from 0.35 to 0.9 micron, the step of adding to the reaction mixture at between 50% and 95% of the desired final conversion of vinyl chloride monomer to polymer a molecular weight regulator for polyvinyl chloride selected from the group consisting of polyhaloalkanes, polyhaloalkenes, alkyl aldehydes, ethyl dibromoacetate, ethyl dibromomalonate, benzene sulfonyl chloride and its monomethyl and monohalo derivatives, 1,1,1-tribromo-2-methyl propanol-2, allyl bromide, N-chlorophthalimide, alkyl iodides, and phenacyl bromide, in effective amount to give a final polymer having an intrinsic viscosity of from 0.75 to 1.3 measured in cyclohexanone at 30° C.

9. In the method of emulsion polymerization of vinyl chloride at a temperature from 40° C. to 60° C. to a desired final conversion of monomeric vinyl chloride to polymer of 50% to 95% to form a latex having an average particle diameter from 0.35 to 0.9 micron, the step of adding to the reaction mixture at between 50% and 95% of the desired final conversion of vinyl chloride monomer to polymer a molecular weight regulator for polyvinyl chloride selected from the group consisting of polyhaloalkanes, polyhaloalkenes, alkyl aldehydes, ethyl dibromoacetate, ethyl dibromomalonate, benzene sulfonyl chloride and its monomethyl and monohalo derivatives, 1,1,1-tribromo-2-methyl propanol-2, allyl bromide, N-chlorophthalimide, alkyl iodides, and phenacyl bromide, in effective amount within the range of 0.1% to 10% based on the weight of monomeric vinyl chloride remaining in the reaction mixture at the time of addition of the regulator to give a final polymer having an intrinsic viscosity of from 0.75 to 1.3 measured in cyclohexanone at 30° C.

References Cited in the file of this patent

UNITED STATES PATENTS

| | | |
|---|---|---|
| 2,553,916 | Halbig | May 22, 1951 |
| 2,616,886 | Danzig | Nov. 4, 1952 |
| 2,647,107 | Barnes | July 28, 1953 |

FOREIGN PATENTS

| | | |
|---|---|---|
| 923,547 | France | July 9, 1947 |
| 494,989 | Belgium | Oct. 6, 1950 |